United States Patent
Matlack et al.

(10) Patent No.: US 11,321,879 B2
(45) Date of Patent: May 3, 2022

(54) MAP DRIVEN AUGMENTED REALITY

(71) Applicant: GM Cruise Holdings LLC, San Francisco, CA (US)

(72) Inventors: Charles Matlack, San Francisco, CA (US); Georgios Georgiou, San Francisco, CA (US)

(73) Assignee: GM Cruise Holdings, LLC, San Francisco, CA (US)

( * ) Notice: Subject to any disclaimer, the term of this patent is extended or adjusted under 35 U.S.C. 154(b) by 134 days.

(21) Appl. No.: 16/589,092

(22) Filed: Sep. 30, 2019

(65) Prior Publication Data

US 2021/0097728 A1 Apr. 1, 2021

(51) Int. Cl.
*G06T 11/00* (2006.01)
*G01C 21/36* (2006.01)
*G01C 21/28* (2006.01)
*G06F 16/29* (2019.01)
*G01C 21/34* (2006.01)
*G08G 1/00* (2006.01)

(52) U.S. Cl.
CPC .............. *G06T 11/00* (2013.01); *G01C 21/28* (2013.01); *G01C 21/3438* (2013.01); *G01C 21/3635* (2013.01); *G01C 21/3667* (2013.01); *G06F 16/29* (2019.01); *G06T 2200/24* (2013.01); *G08G 1/202* (2013.01)

(58) Field of Classification Search
CPC ......... G06T 11/00; G06F 16/29; G01C 21/28; G01C 21/3438; G01C 21/3635; G01C 21/3667
See application file for complete search history.

(56) References Cited

U.S. PATENT DOCUMENTS

| | | | |
|---|---|---|---|
| 2018/0191863 A1* | 7/2018 | Matthiesen | H04L 67/10 |
| 2019/0171943 A1* | 6/2019 | Pao | G06F 16/29 |
| 2019/0206258 A1* | 7/2019 | Chang | G08G 1/123 |
| 2019/0259182 A1* | 8/2019 | Sarukkai | G06K 9/00791 |
| 2020/0103239 A1* | 4/2020 | Schwie | G05D 1/0088 |
| 2020/0363216 A1* | 11/2020 | Elvanoglu | G01C 21/32 |

\* cited by examiner

*Primary Examiner* — Hussein Elchanti
(74) *Attorney, Agent, or Firm* — Polsinelli, PC

(57) ABSTRACT

The subject disclosure relates to techniques for providing augmented reality (AR) navigation guidance to users of an autonomous vehicle (AV) ride hailing service. In some aspects, a method of the disclosed technology includes steps for transmitting an autonomous vehicle (AV) ride request to an AV dispatch service, receiving a ride confirmation indicating that an AV has been dispatched to a rider associated with the mobile device, detecting arrival of the AV at a pick-up location associated with the rider, and initializing augment reality (AR) guidance on the mobile device, wherein the AR guidance is configured to provide the rider with navigation information to facilitate pick-up by the AV. Systems and computer-readable media are also provided.

12 Claims, 8 Drawing Sheets

MAP DRIVEN AUGMENTED REALITY

BACKGROUND

1. Technical Field

The subject technology provides techniques for providing navigation guidance to a rider of an autonomous vehicle (AV) service and in particular, for providing route guidance via mobile-device using augmented reality (AR).

2. Introduction

Autonomous vehicles (AVs) are vehicles having computers and control systems that perform driving and navigation tasks conventionally performed by a human driver. As AV technologies continue to advance, ride-hailing services will increasingly utilize AVs to improve service safety and efficiency. For effective use in ride-hailing deployments, AVs will be required to execute many service functions that are conventionally performed by human drivers.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
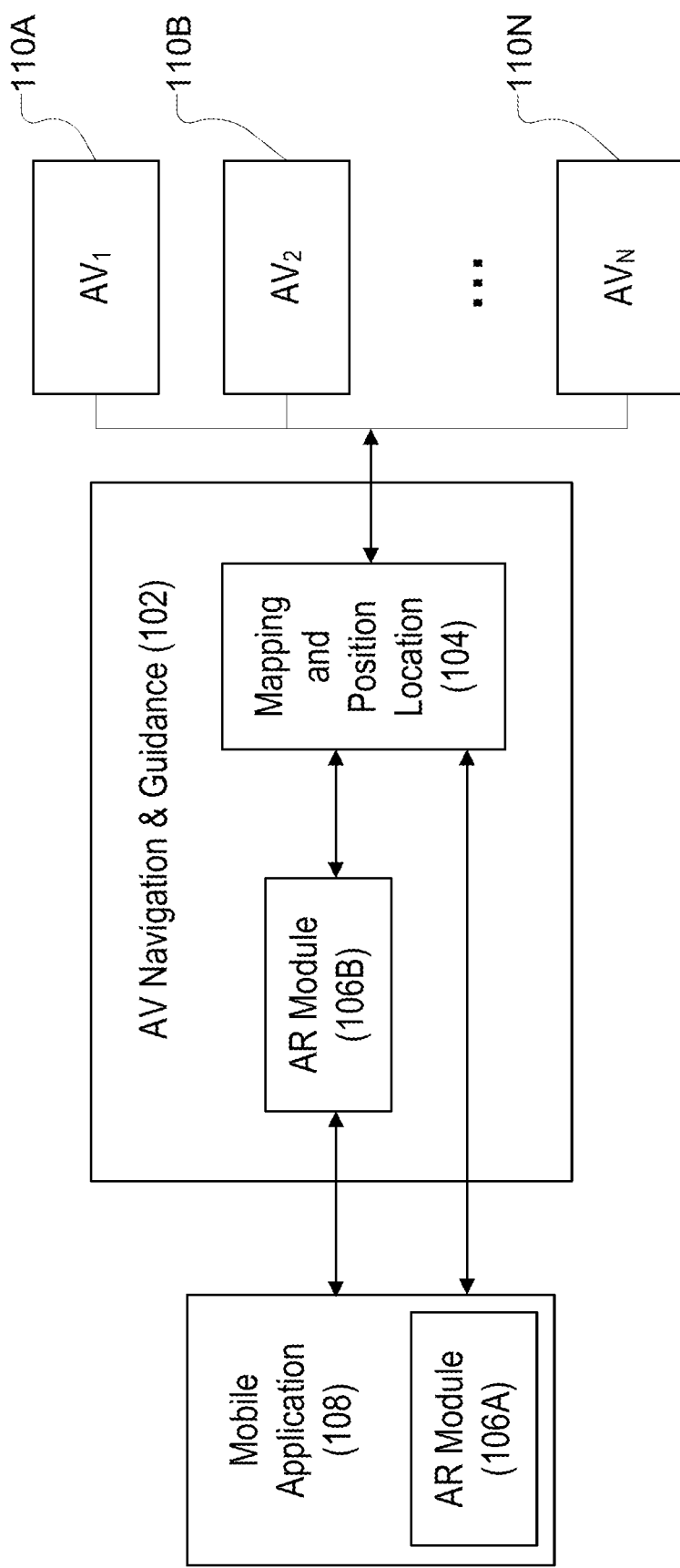
FIG. 1 illustrates a conceptual block diagram of an example AV Navigation and Guidance System that can be configured to implement some aspects of the disclosed technology.

The detailed description set forth below is intended as a description of various configurations of the subject technology and is not intended to represent the only configurations in which the technology can be practiced. The appended drawings are incorporated herein and constitute a part of the detailed description that includes specific details for the purpose of providing a more thorough understanding of the disclosed technology. However, it will be clear and apparent that the subject technology is not limited to the specific details set forth herein and may be practiced without these details. In some instances, structures and components are shown in block diagram form to avoid obscuring the concepts of the subject technology.

As described herein, some aspects of the present technology include the gathering and use of data available from various sources to improve quality and experience. The present disclosure contemplates that in some instances, this gathered data may include personal information. The present disclosure contemplates that the entities involved with such personal information respect and value privacy policies and practices.

One difficulty in implementing ride hailing services is providing accurate, user-friendly navigation instructions to help users easily find the pick-up location before beginning a ride, or their intended final destination when disembarking from a ride. Although some conventional ride hailing applications provide maps to assist user navigation, there is abundant opportunity to improve the user experience by providing improved visual aids and more intuitive route visualizations.

The disclosed technology addresses the foregoing limitations of conventional ride hailing services by providing ways to facilitate rider navigation using augmented reality (AR). In some approaches, AR guidance is provided on the user's (rider's) mobile-device (e.g., smart phone), by superimposing visual cues (e.g., virtual object) onto an image stream received on the mobile device, such as a camera image. Navigation guidance using AR can include static or dynamic (animated) graphical representations that can convey navigation paths/directions, indicate locations of interest, and/or provide other navigation instructions or guidance. In some aspects, AR guidance can be provided using animated graphics, such as moving arrows or other visual call-outs. In rider drop-off scenarios, for example, AR guidance may provide visual cues to assist the rider in safely exiting the AV, crossing a street or intersection, and/or otherwise reach their destination in a safe and expedient manner. In rider pick-up scenarios, AR guidance can provide directions for reaching a rendezvous location, such as a designated airport pick-up location. By way of example, AR animations may be inserted into or superimposed onto an image (camera) feed displayed on the mobile device when the device is pointed in a direction of the desired pick-up location.

Providing accurate AR navigation guidance is accomplished through accurate location and orientation (together known as pose) tracking of the rider's mobile device. Accurate determinations of device pose can be achieved using a variety of sensor modalities, including but not limited to: Global Positioning System (GPS) signals, compasses and/or accelerometer information of the mobile-device. In some aspects, map-based location methods can be used, for example, by comparing an image stream captured by the mobile device with a high-density map, such as a LiDAR map of the surrounding environs. It is understood that high-density maps can be comprised of virtually any mix of sensor data types, including but not limited to: LiDAR, camera images, radar, sonar, depth images, and/or images containing non-visible spectra, such as infra-red (IR), and the like.

In such approaches, visual artifacts captured in the image stream are compared to a high-resolution LiDAR map to determine a precise location of the mobile device. As discussed in further detail below, combinations of positioning and/or orientation data can be used to precisely place mobile device location and orientation in three-dimensional space. Additionally, in some aspects, combinations of location data may be used to improve the efficiency of location calculations. For example, GPS location information may be used identify portions of a high-density LiDAR map that should be used for comparison with an incoming image stream to detect mobile device location, thereby improving location tracking efficiency and speed.

FIG. 1 illustrates a conceptual block diagram of an example AV Navigation and Guidance System 102 that can be configured to implement some aspects of the disclosed technology. Guidance system 102 includes a mapping and position location module (location module) 104 and an autonomous reality (AR) module 106. Location module 104 is configured for communication with one or more AVs 110 (e.g., $AV_1$ 110A-$AV_N$ 110N), as well as AR module 106. In turn, AR 106 module is configured to facilitate and coordinate necessary AR computing between guidance system 102 and mobile application 108, i.e., using a local portion (106A) that is resident on a mobile device, and a remote portion (106B) that resides on guidance system 102. Guidance system 102 can be configured to receive data from multiple AVs 110, as well as various mobile devices (not illustrated) that can communicate with guidance system 102 via respective mobile applications 108. By way of example, guidance system 102 can be configured to receive ride requests, and to facilitate AV dispatch and navigation functions.

Using location module 104, guidance system 102, can generate and maintain high-resolution maps used for location tracking. For example, location module 104 can continuously collect GPS, image, and/or LiDAR data from various AVs (110A-110N), to construct and update a high-resolution LiDAR map that can be used for ascertaining positions of the various AVs and/or mobile devices, for example, using mobile application 108. High resolution maps can be constructed and updated from data obtained and transmitted by various AVs (e.g., AVs 110A-110N), as well as one or more mobile-devices, for example, via a mobile application 108.

Location module 104 can be configured to determine position/location information for one or more AVs and/or one or more mobile-devices. In some aspects, location module 104 includes (or is configured to access) a high-resolution three-dimensional geographic map, such as a high-resolution LiDAR map used for ascertaining device and/or vehicle location. In some approaches, location module 104 can use multiple signals to perform position tracking. For example, location module may ingest GPS coordinate information together with image capture information from one or more AV's and/or mobile devices to determine precise locations of each.

Navigation and guidance system 102 can also be configured to facilitate user/rider navigation using AR guidance that is provided by AR module 106. Depending on the desired application, AR module 106 may be executed on one or more platforms, or distributed between hardware devices. For example, part of mobile application 108 can be executed on a remote mobile device (not shown), and/or as a process running on guidance system 102. As understood by those of skill in the art, all or portions of AV Navigation and Guidance system 102 can be implemented as physical and/or virtual systems, for example, that are running on one or more of AVs 110, or that are instantiated in a distributed computing configuration, such as a cloud computing environment. Additionally, it is understood that AR module 106 may represent multiple instances of AR guidance software, for example, that are executed in conjunction with corresponding instances of a ride-hailing application, each of which may be associated with different rider/user accounts. As such, it is understood that the functional topology illustrated with respect to guidance system 102, mobile application 108, and AVs 110 is provided for explanation, however, various functions (or portions thereof) may be implemented by computing systems resident on physically separate hardware devices, without departing from the scope of the disclosed technology.

In practice, mobile application 108 is configured to provide functionality to a user/rider associated with a corresponding mobile device (not illustrated), i.e., to facilitate the request and management of AV ride services from an AV ride service provider. For example, a user can use mobile application 108 to hail an AV pick-up, indicate pick-up and/or drop-off locations, and/or to provide ride or route preferences, etc. Additionally, mobile application 108 (with the use of AR module 106A), can provide real-time navigational guidance to the user. For example, AR module 106 can provide instructions and visual cues configured to help the user navigate to an intended destination after drop-off by the AV, or to navigate to a pick-up location, such as a designated airport pick-up location. Navigational guidance can be provided in virtually any output that is supported by the mobile-device, including but not limited to: augmented reality (AR), interactive maps, and/or voice guidance, etc.

As discussed in further detail below, AR guidance can be initiated based on a variety of different situational triggers. For example, AR guidance may be initialized in response to user interactions with the mobile device, or based on situational cues relating to the ride service to be provided. For example, user interactions indicating that AR guidance may be desired (e.g., the user holding up his device up to capture images of the surrounding areas), can cause AR guidance to be initiated by AR module 106A. Additionally, a detected conclusion of a ride service (e.g., AV approach toward a drop-off location), may cause AR guidance to initialize, for example, to provide the user with navigation instructions for reaching her final destination.

In order to provide useful AR guidance, AR module 106, in conjunction with mobile application 108, can be configured to identify a precise location and orientation (pose) of a mobile device associated with the rider. In some approaches, AR navigation guidance can be provided using animated graphics or other visual cues that are superimposed onto image or video feeds received via a camera on the mobile device and provided to the user via a display. As such, the user/rider can point their mobile device (smartphone) in a direction of their intended path and receive real-time navigational guidance to assist their navigation toward an intended destination, such as a designated airport pick-up location.

To provide useful AR guidance, mobile application 108 and AR module 106 need precise information regarding both the position and orientation of the mobile device. Position and orientation information can be determined from one or more signals provided by a GPS or a compass of the mobile device (for location), and/or one or more accelerometers on the mobile device (for orientation). As discussed in further detail below, location information can also be shared between AVs 110 and the mobile application 108 of a mobile device. For example, an AV location may be more accurately known than that of a mobile device residing inside a cabin of the AV. In such instances, AV 110 may provide location information to the mobile device, including mobile application 108, as the rider exits an AV or as the ride service is coming to an end. Example of ride service drop-off scenarios are discussed in further detail with respect to FIGS. 2 and 3, below.

Figure 2:
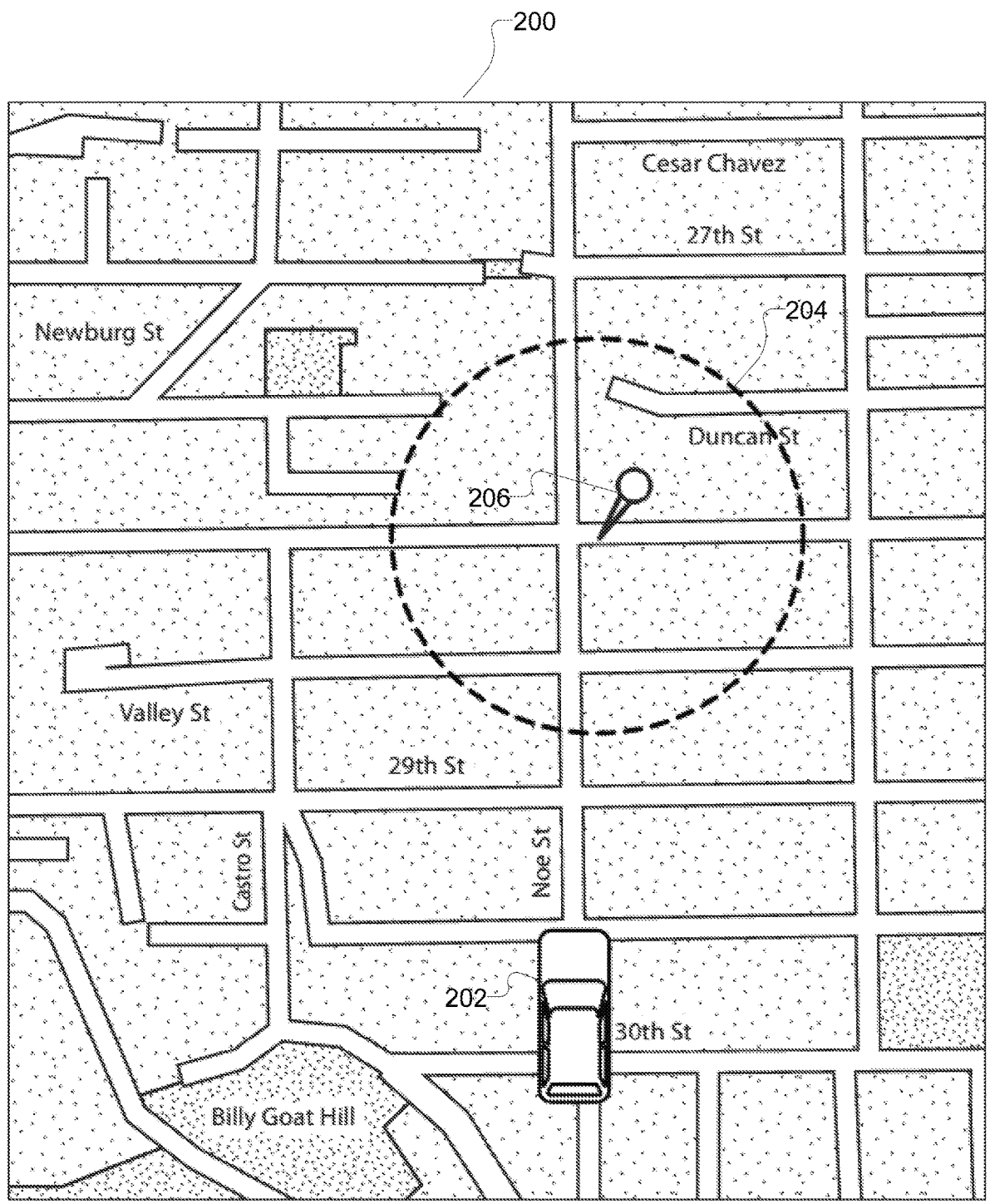
FIG. 2 graphically illustrates a top-down perspective view 200 of an en route AV ride service, according to some aspects of the disclosed technology.

Specifically, FIG. 2 graphically illustrates a top-down perspective view 200 of an en route AV ride service, according to some aspects of the disclosed technology. In perspective view 200, AV 202 is shown approaching a drop-off location 206 that is located within a specified perimeter (geo-fence) 204. In such drop-off scenarios, a location of AV 202 may be more accurately know than that of the user's mobile device, which is typically inside the AV cabin and subject to unreliable GPS signal reception. As such, AV 202 may transmit its location to the user's mobile device, e.g., using mobile application 108, discussed above. Transmission of the AV's 202 location can occur at the end of the ride or, for example, in response to the AV's 202 detected proximity within a threshold distance 204 from drop-off location 206.

In some instances, AR guidance is triggered based on the AVs 202 proximity to drop off location 206. For example, it may be assumed that the user would like navigation assistance after the conclusion of the ride, for example, to help him reach a desired final destination on foot. As such, AR guidance and location handoff may be triggered based on conditions that indicate ride termination, such as user interactions with the mobile device, or changes in location of the mobile device relative to the AV, etc.

Figure 3A:
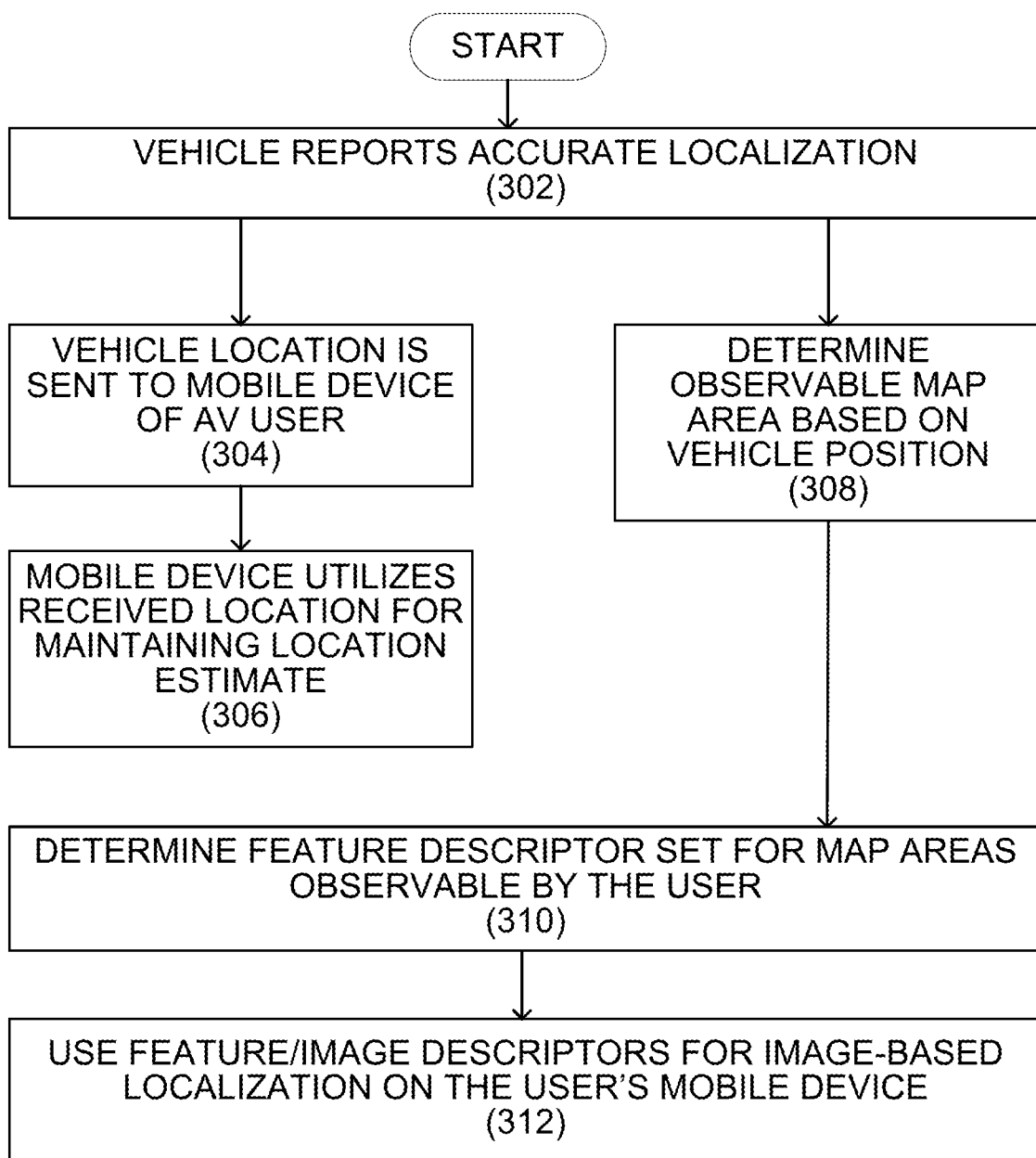
FIGS. 3A and 3B illustrate example processes for initializing AR guidance on a user's mobile device, according to some aspects of the disclosed technology.
Figure 3B:
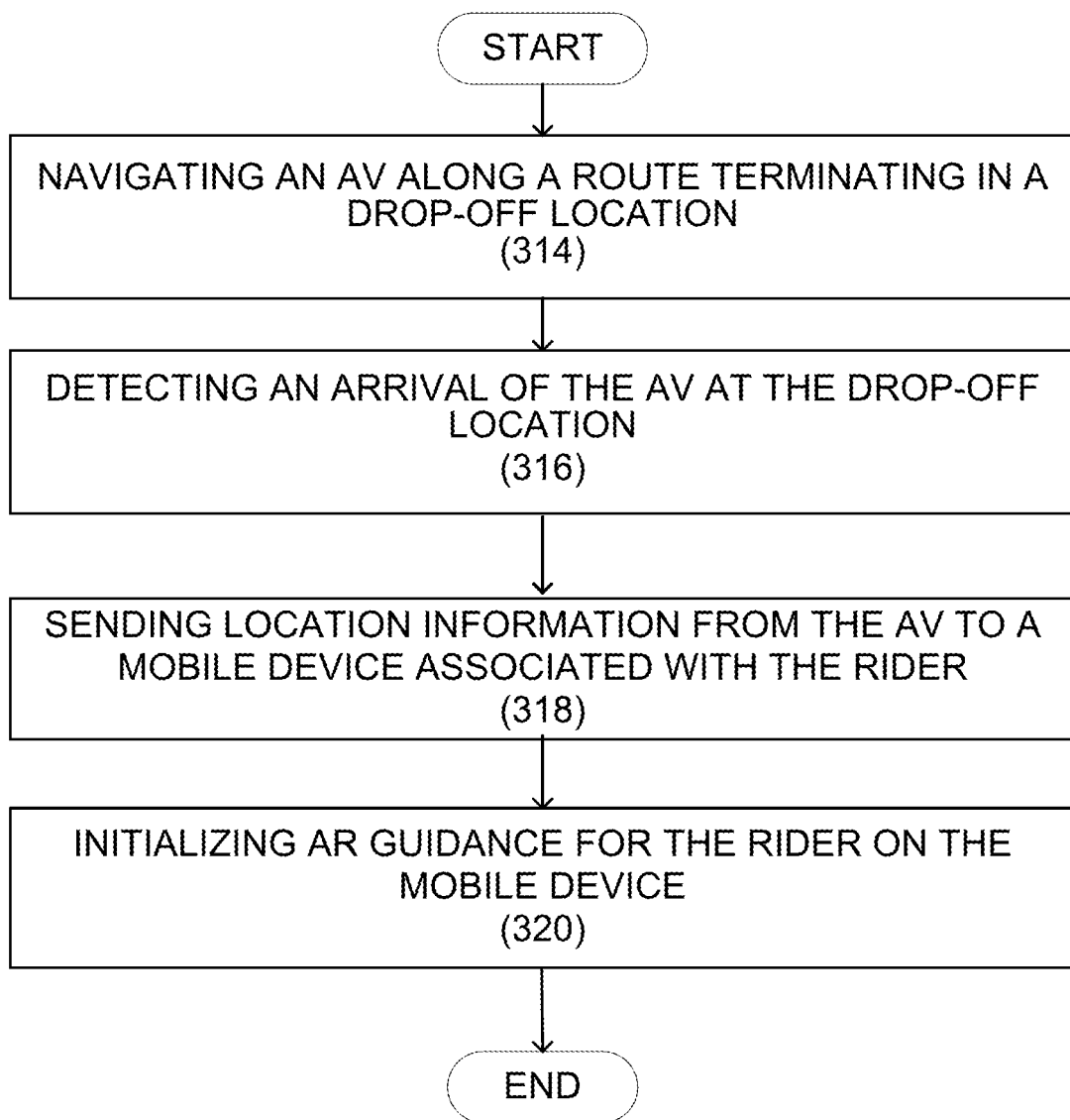

FIGS. 3A and 3B illustrate steps of example methods for providing AR guidance on a user's mobile device. Although some of the examples of AR guidance are provided in the context of rider/user drop-off scenarios, it is understood that these various aspects can also applied to other driving situations, such as in rider pick-up scenarios, without departing from the scope of the technology.

In particular, FIG. 3A illustrates steps of a process 300 for providing AR navigation guidance on a user's mobile device. Process 300 begins with step 302 in which an AV determines (and reports) an accurate pose for example to a navigation and guidance system, such as guidance system 102, discussed above. Accurate AV localization can be based on one or more sensors and/or position-location determining methods. For example, AV localization can be computed from one or more GPS, LiDAR, and/or inertial sensors of the AV. As discussed above, location information for the AV (which can benefit from mixed mode sensor data and better signal receptivity) may be more accurate than position information for a mobile device of the rider, which typically relies on limited GPS signal reception inside the AV cabin.

In step 304, the AV localization information is sent to the mobile device. As discussed above, location handoff can be triggered based on the satisfaction of certain pre-conditions, such as based on user preferences and/or proximity to a drop-off location. For example, if the AV is proximate to a final drop-off location then it may be inferred that location information should be passed from the AV to the mobile-device, for example, to facilitate later AR guidance. Transmission of location information from the AV to the user's mobile device can be done directly (e.g., from AV to mobile device), for example, using Bluetooth or WiFi. Alternatively, the location information may be transmitted using a cloud relay, such as via guidance system 102, discussed above. In some aspects, transmission of location information (e.g., from AV to the user's mobile device) can be repeatedly performed e.g., in a continuous manner such that the mobile device is provided with location updates throughout the provided ride service.

In step 306, the mobile device utilizes the received location information, from step 304, and continues to maintain its location estimate. In this process, which can be performed in parallel to other process steps (e.g., 310 and 312), the mobile-device can used a variety of mixed mode sensor means for maintaining its location estimate. By way of example, the mobile device can utilize its camera to capture image/video feed of the surrounding environs, which can be used in conjunction with a high-resolution LiDAR map to determine pose. Additionally, GPS, WiFi, compass sensors and/or inertial sensors can be used to perform persistent location tracking.

In step 308, which can occur in parallel to steps 304 and 306, an observable map area can be determined, for example, by a cloud-based guidance system, using the AV location information. By way of example, if the user recently exited the AV, then assumptions may be made about the user's location, for example, based on the initial AV location determined in step 302 and inertial measurements made from the mobile device that can be used to infer a precise location of the mobile device. Determining an approximate observable map area can be used for identifying and selecting image and/or feature descriptors that need to be provided to the mobile device so that they can be used for helping to determine device localization and pose using image-to-LiDAR location mapping (step 310). As used herein, feature descriptors can refer to any informational landmarks or signatures present in image data that can be used to determine pose information of a mobile-device. For example, feature descriptors can include (mathematically) unique image structures that can be used to identify a map location. As used herein, an image descriptor can refer to a set of feature descriptors that can be used to reference or define a unique image defines a location position within a known map.

In some approaches, knowing an approximate position of the mobile device can speed location computations using image/feature descriptors, as discussed in further detail below. For example, based on the approximate map area that includes the mobile device, a set of corresponding feature/image descriptors can be received at the mobile device, for example, from an AV Navigation and Guidance system 102, as discussed above.

In step 312, one or more images collected from the mobile device camera are processed to determine feature and/or image descriptors for the surrounding environs. The feature/image descriptors received based on the map area (step 310) can be compared to the feature/image descriptors resulting from images collected by a camera of the mobile device. By matching collected images from the device camera to known regions (e.g., of a high-resolution LiDAR map), a precise location and pose (orientation) of the mobile device can be determined. Localization and orientation determinations of the mobile device can continue as new image/video data is collected and processed. As discussed in further detail below, accurate position and orientation tracking are necessary for rendering usable AR guidance on a display of the mobile device.

FIG. 3B illustrates steps of an example process 301 for initializing AR guidance for a user, on the user's mobile device. Process 301 begins with step 314 in which an AV is engaged in providing a ride service for the user/rider, wherein the ride service terminates at a drop-off location, for example, similar to the drop-off scenario depicted in FIG. 2, discussed above.

In step 316, an arrival of the AV at the drop-off location is detected e.g., by the AV and/or using a mobile application on the mobile device. In some aspects, arrival detection is based on detection of the AV within a predetermined threshold distance from the drop-off location, e.g., when the AV crosses a pre-determined geo-fence around the drop-off location.

In step 320, AR guidance for the rider/user is initialized on the mobile device in response to the detected arrival at the drop-off location. Depending on the desired implementation, AR guidance initialization can be cause by different preconditions, such as the user's interaction with his/her mobile device. An application on the mobile device may be used to indicate that AR guidance is available. In such instances, further user input (acknowledgement) may be required, for example, through touch or voice guidance received by the user, to cause AR guidance to fully initialize.

Figure 4:
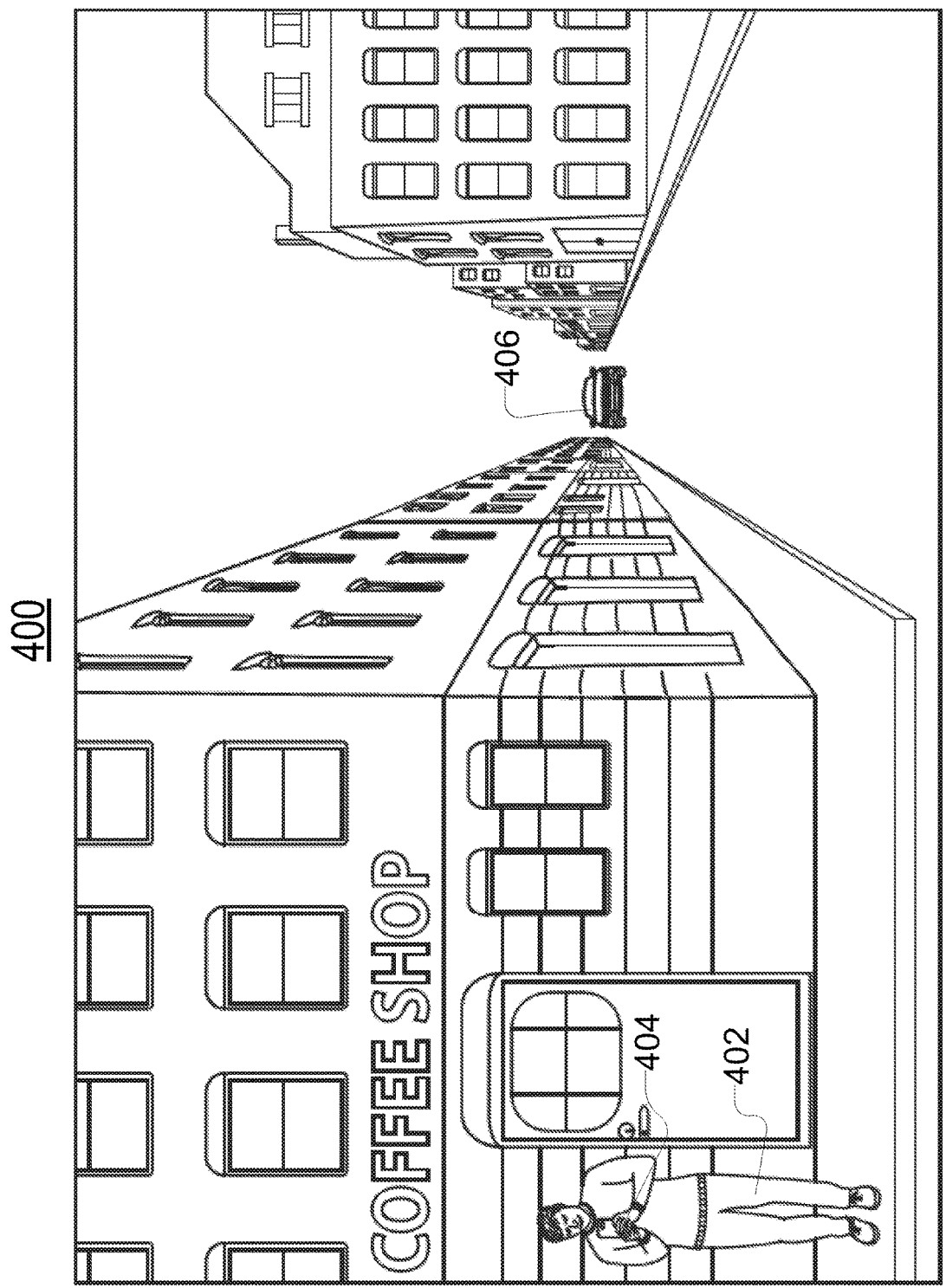
FIG. 4 graphically illustrates a perspective view of a pick-up performed by an AV ride service, according to some aspects of the disclosed technology.

FIG. 4 conceptually illustrates a pick-up scenario 400, according to some aspects of the disclosed technology. Scenario 400 depicts user 402 operating mobile device 404 to hail an AV ride service provided by AV 406. Mobile device 404 includes one or more applications (e.g., mobile application 108) needed to perform processing necessary to determine a precise location and pose of mobile device 404, for example, so that AR guidance can be provided to user 402 to facilitate pick up by AV 406.

As discussed above, mobile device 404 may be configured to utilize multiple sensor (e.g., GPS, accelerometers, WiFi, etc.) to determine position and pose. Additionally, mobile device 404 can be configured to make location determinations based on image/feature descriptors that are identified from images/video taken of the surrounding environs. A more detailed process regarding the use of image feeds to make location determinations is discussed in relation to the process of FIG. 5A.

Figure 5A:
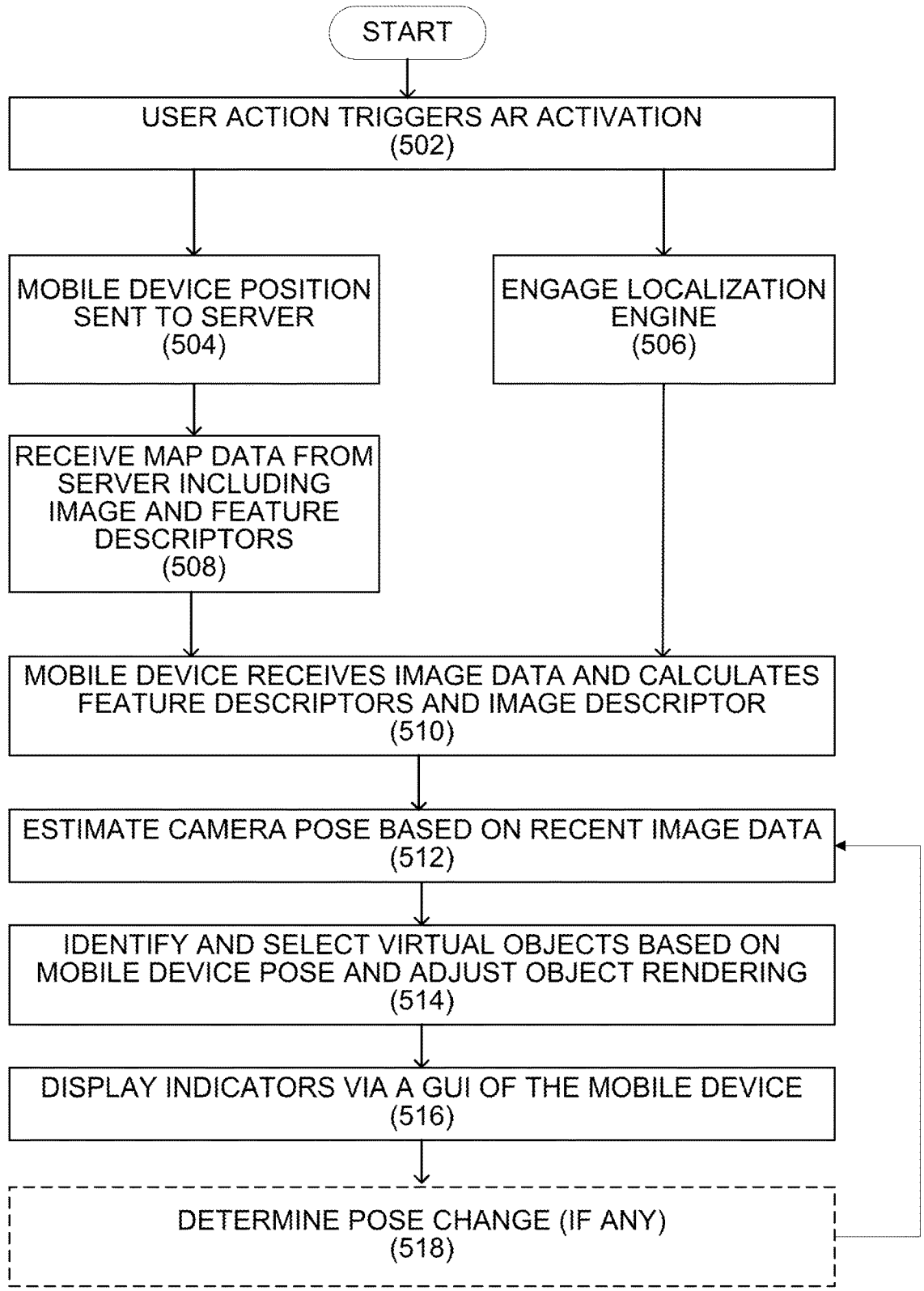
FIGS. 5A and 5B illustrate example processes for implementing AR guidance on a user's mobile device, according to some aspects of the disclosed technology.

In particular, FIG. 5A illustrates steps for a process 500 for identifying (and updating) location and pose determinations of a mobile device, for example, that is being operated by a user to initiate and AV ride pick-up. Process 500 begins with step 502 in which a user action triggers the preparation and activation of an AR guidance feature on the mobile device. Depending on the preferred embodiment, any of a variety of user interactions with the mobile device may trigger AR activation. For example, AR activation may be triggered in response to the hailing of an AV using a ride service app (e.g., application 108). Alternatively, a detected approach of the AV, for example, within a pre-determined distance of the pick-up location may trigger AR guidance. Additionally, as discussed above, the user's engagement with the mobile device, for example, by holding the device to capture surrounding imagery, may indicate that the user wishes to initiate AR guidance features.

In step 504, a position of the mobile device is determined and sent to a server e.g., to a navigation and guidance system 102, as discussed above. The initial position of the mobile device sent to the server may be an approximate location based on GPS coordinate data and/or on WiFi location tracking, etc. Using the transmitted mobile device position the navigation and guidance system 102 can identify image/feature descriptors associated with portions of the map that contain the mobile device. The image/feature descriptors can then be downloaded to the mobile device for use in performing high accuracy localization based on received camera images (step 508).

In step 506, which can be executed in parallel with steps 504 and 508, a localization of engine of the mobile device is engaged. In some aspects, localization engine functionality can be provided as part of an application executed on the mobile device (e.g., mobile application 108). Engagement of the localization engine can cause initialization of position monitoring hardware resources, such as: GPS, inertial sensors and/or compass. In some aspects, engagement of the localization engine may switch the GPS into a "high-effort" mode, possibly causing the consumption of additional power resources. As discussed above, where localization information of higher accuracy is available from another source, such as via an AV providing ride service, then such location data may be received as part of the localization engine engagement process.

In step 510, the mobile device receives image/video data (e.g., via an on-device camera) and processes the received image data to calculated image and/or feature descriptors that can be used to perform device localization. In some aspects, localization is performed by comparing the downloaded image/feature descriptors (from step 508), with the extracted descriptors calculated from image feeds captured by the mobile device. In some aspects, using a matching algorithm, a coarse location of the mobile device can be determined.

In step 512, a pose of the mobile device can be estimated based on the most recent image data received by the camera. Similar to step 510, pose estimation can be performed by comparing feature descriptors with downloaded descriptors to estimate the mobile device pose (orientation) with respect to a map.

In step 514, one or more virtual objects are identified and selected for insertion into a Graphical User Interface (GUI) displayed on the user device. In some approaches, a user interface will provide a camera/video feed, for example, displaying whatever region of the surrounding area the mobile device camera is aimed at. Virtual objects can be inserted as an overlay on the displayed image feed and rendered based on mobile-device pose such that the virtual object can be seamlessly integrated into a video/image feed of the surrounding environs.

Optionally, in some aspects, rendering of virtual objects over the video/image feed can be adjusted in real-time based on detected changes in device pose (step 516). By way of example, inserted virtual objects may be realigned to match object images received from the camera, thereby providing persistent AR guidance as the user and mobile device move.

The inserted virtual objects may include indicators associated with a map position, for example, that are configured to facilitate user navigation by providing intuitive route guidance. By way of example, AR indicators may suggest the locations of crosswalks, entryways, and/or provide other navigation tips. Additionally, AR virtual guidance may include the augmentation of objects or other indicators with visual effects, such as shading or graphical overlays. By way of example, a red carpet-like overlay may be provided that includes directional features, for example, to indicate a desired course that is suggested to the user.

In optional step 518, orientation and position changes of the mobile device (if any) can be detected. If significant changes are detected that may require AR re-rendering, then step 518 proceeds back to 512, and mobile device position and pose are recalculated based on recently received image streams.

Figure 5B:
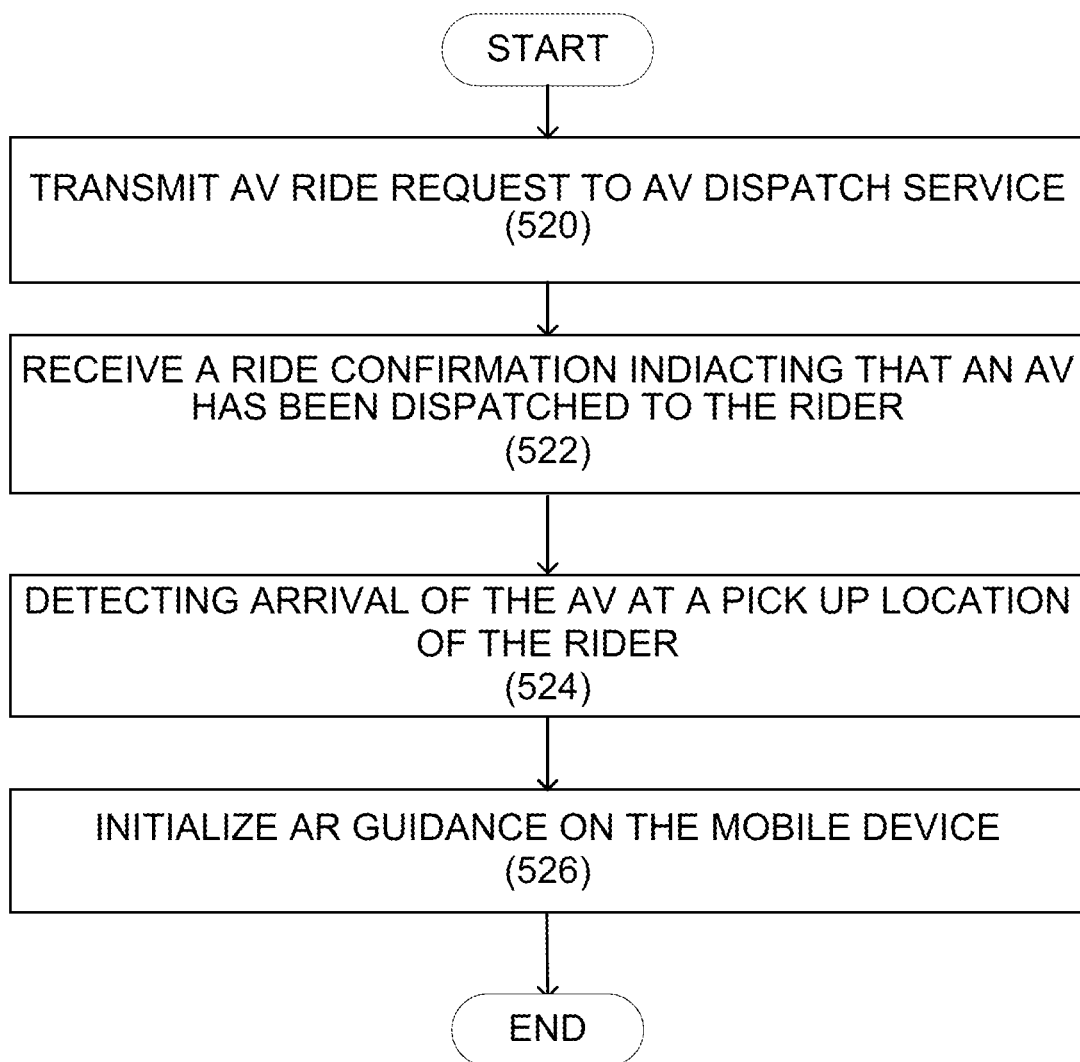

FIG. 5B illustrates steps of an example process 501 that can be performed by a mobile device, for example, to facilitate a user/rider AV pick-up service, according to some aspects of the disclosed technology. Process 501 begins with step 520 in which a mobile device transmits a ride request to an AV dispatch service. As discussed above with respect to FIG. 1, sending of the ride request can be facilitated by an application on the user's mobile device (e.g., mobile application 108), and sent the AV Navigation and Guidance System 102, which can handle AV dispatch and routing functions.

In step 522, after the AV has been selected and dispatched, a ride confirmation is received at the user's mobile device indicating that a pick-up AV is en route. Ride confirmations may contain different types of information, depending the desired implementation. For example, the ride confirmations may indicate a type of car, an estimated time of arrival and/or provide navigation guidance to the user/rider.

In step 524, arrival of the AV at the pick-up destination is detected. As discussed above with respect to FIG. 2, arrival of the AV may be detected when the AV is within a predetermined threshold distance of the vehicle. By way of example, an arrival notification may be sent to the user when the AV is 0.5 miles, 0.25 miles or 0.10 miles away from the pick-up location. Additionally, AV arrival may trigger AR guidance that is provided to the user on the mobile-device, for example, to help guide the user to a safe and convenient pick-up location for rendezvous with the AV.

In step 526, AR guidance is initialized on the user's mobile device. The initialization of AR guidance may be triggered by the user's interaction with the mobile device, such as, selection of buttons or menus (via an application), to indicate that AR guidance is desired. As discussed above, AR guidance may also be triggered automatically, for example, based on the approach of the AV to the pick-up location. In some embodiments, AR guidance may be initialized immediately after the ride request is transmitted (i.e., step 520). In such instances, AR guidance may provide instructions to facilitate the user's arrival at the pick-up location as soon as a ride hailing service is requested.

In some implementations, the AR guidance can take the form of virtual objects or effects that are provided to a user interface of the mobile device, for example, to provide indicators or hints to help the user reach the AV pick-up location. As discussed above, AR indicators may suggest walkways and/or provide other navigation tips, for example, in the form of visual effects, such as shading or graphical overlays. In some aspect, virtual objects may be use to indicate locations or features that may be of particular relevance or interest to the user.

Figure 6:
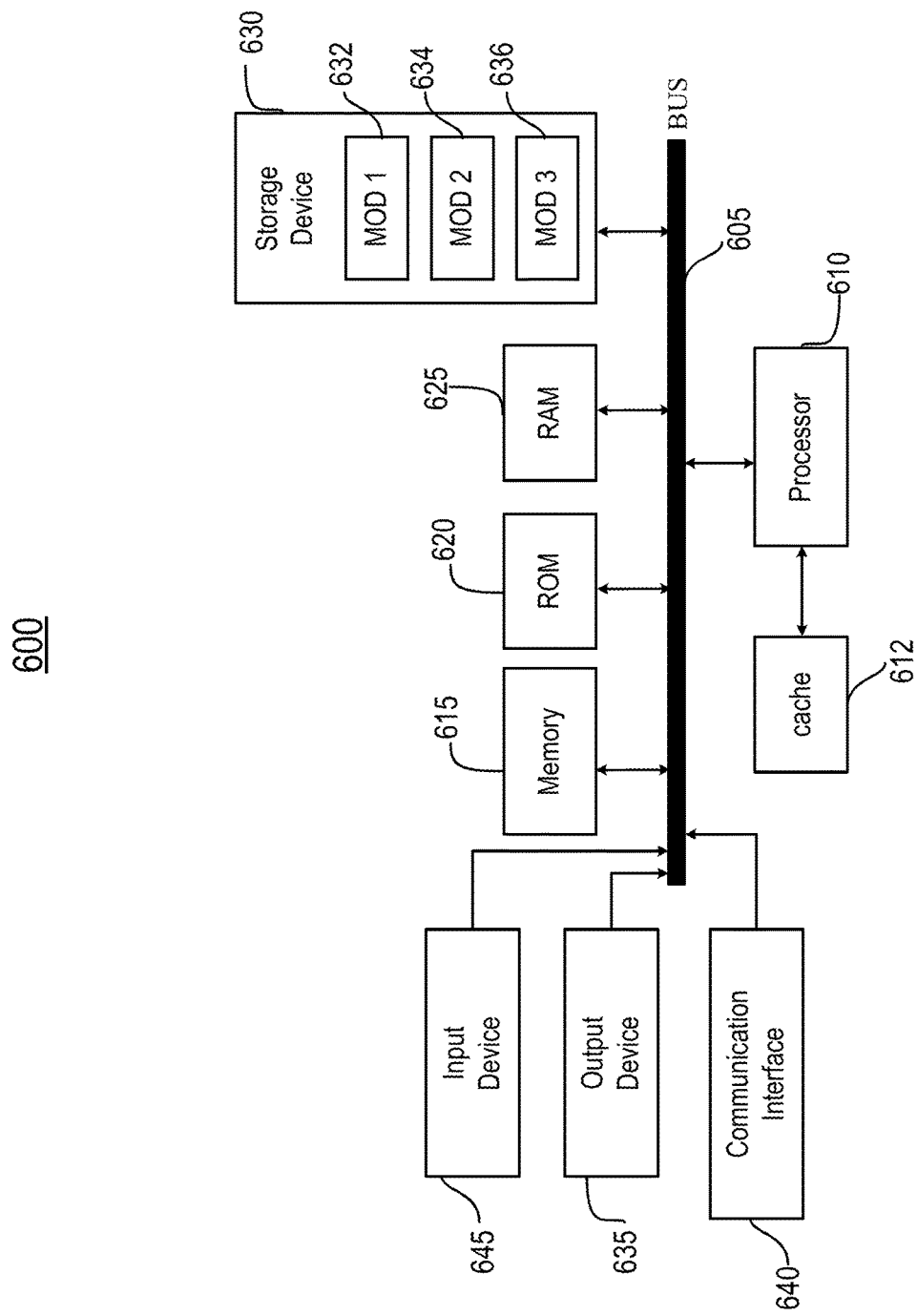
FIG. 6 illustrates an example processor-based system with which some aspects of the disclosed technology can be implemented.

FIG. 6 illustrates an example processor-based system with which some aspects of the subject technology can be implemented. Specifically, FIG. 6 illustrates system architecture 600 wherein the components of the system are in electrical communication with each other using a bus 605. System architecture 600 can include a processing unit (CPU or processor) 610, as well as a cache 612, that are variously coupled to system bus 605. Bus 605 connects various system components including a non-transitory computer-readable storage medium 615, (e.g., read only memory (ROM) 620 and random-access memory (RAM) 625, to processor 610.

System architecture 600 can include a cache of high-speed memory connected directly with, in close proximity to, or integrated as part of the processor 610. System architecture 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. Memory 615 can include multiple different types of memory with different performance characteristics. Processor 610 can include any general purpose processor and a hardware module or software module, such as module 1 (632), module 2 (634), and module 3 (636) stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the computing system architecture 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms. In some instances, multimodal systems can enable a user to provide multiple types of input to communicate with the computing system architecture 600. Communications interface 640 can generally govern and manage the user input and system output. There is no restriction on operating on any particular hardware arrangement and therefore the basic features here may easily be substituted for improved hardware or firmware arrangements as they are developed.

Environmental sensors 650 can include various sensors that are configured to make measurements/detect the surrounding environs and provide corresponding signaling to processor 610. Although environmental sensors 650 can include sensors of virtually any type, in some implementations environmental sensors 650 can include one or more cameras, depth cameras, LiDARs, and/or sonars, etc.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 can include software modules 632, 634, 636, for controlling processor 610. Other hardware or software modules are contemplated. Storage device 630 can be connected to the system bus 605. In one aspect, a hardware module that performs a particular function can include the software component stored in a computer-readable medium in connection with the necessary hardware components, such as the processor 610, bus 605, output device 635, and so forth, to carry out various functions of the disclosed technology.

By way of example, instruction stored on computer-readable media can be configured to cause one or more processors to perform operations including: navigating an autonomous vehicle (AV) along a route terminating in a drop-off location specified by a rider of the AV; detecting an arrival of the AV at the drop-off location; sending location information of the AV to a mobile device associated with the rider; and initializing augment reality (AR) guidance for the rider on the mobile device, wherein the AR guidance is configured to provide the rider with navigation information pertaining to the drop-off location.

By way of further example, instructions stored on computer-readable media can be configured to cause one or more processors to perform operations including: transmitting an autonomous vehicle (AV) ride request from a mobile device to an AV dispatch service, wherein the ride request comprises location information of the mobile device; receiving, at the mobile device, a ride confirmation indicating that an AV has been dispatched to a rider associated with the mobile device; detecting arrival of the AV at a pick-up location associated with the rider; and initializing augment reality (AR) guidance on the mobile device, wherein the AR guidance is configured to provide the rider with navigation information to facilitate pick-up by the AV.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method, comprising:
    transmitting an autonomous vehicle (AV) ride request from a mobile device to an AV dispatch service, wherein the ride request comprises location information of the mobile device;
    receiving, at the mobile device, a ride confirmation indicating that an AV has been dispatched to a rider associated with the mobile device;
    detecting arrival of the AV at a pick-up location associated with the ride, wherein detecting the arrival of the AV at the pick-up location is determined based on a threshold distance of the AV from the pick-up location; and
    automatically initializing augmented reality (AR) guidance on the mobile device in response to detecting the arrival of the AV at the pick-up location, wherein the AR guidance is configured to provide the rider with navigation information to facilitate pick-up by the AV, and wherein initializing the AR guidance causes a capture of surrounding imagery with the mobile device.

2. The computer-implemented method of claim 1, wherein the navigation information indicates a designated pick-up location.

3. The computer-implemented method of claim 1, wherein the location information is based on a Light Detection and Ranging (LiDAR) map corresponding with the pick-up location.

4. The computer-implemented method of claim 1, wherein the location information is based on a Global Positioning System (GPS) information associated with the mobile device.

5. A system comprising:
    one or more processors; and
    a computer-readable medium comprising instructions stored therein, which when executed by the processors, cause the processors to perform operations comprising:
        transmitting an autonomous vehicle (AV) ride request from a mobile device to an AV dispatch service, wherein the ride request comprises location information of the mobile device;
        receiving, at the mobile device, a ride confirmation indicating that an AV has been dispatched to a rider associated with the mobile device;
        detecting arrival of the AV at a pick-up location associated with the rider, wherein detecting the arrival of the AV at the pick-up location is determined based on a threshold distance of the AV from the pick-up location; and
        automatically initializing augmented reality (AR) guidance on the mobile device in response to detecting the arrival of the AV at the pick-up location, wherein the AR guidance is configured to provide the rider with navigation information to facilitate pick-up by the AV, wherein initializing the AR guidance causes a capture of surrounding imagery with the mobile device.

6. The system of claim 5, wherein the navigation information indicates a designated pick-up location.

7. The system of claim 5, wherein the location information is based on a Light Detection and Ranging (LiDAR) map corresponding with the pick-up location.

8. The system of claim 5, wherein the location information is based on a Global Positioning System (GPS) information associated with the mobile device.

9. A non-transitory computer-readable storage medium comprising instructions stored therein, which when executed by one or more processors, cause the processors to perform operations comprising:

transmitting an autonomous vehicle (AV) ride request from a mobile device to an AV dispatch service, wherein the ride request comprises location information of the mobile device;

receiving, at the mobile device, a ride confirmation indicating that an AV has been dispatched to a rider associated with the mobile device;

detecting arrival of the AV at a pick-up location associated with the rider, wherein detecting the arrival of the AV at the pick-up location is determined based on a threshold distance of the AV from the pick-up location; and automatically initializing augmented reality (AR) guidance on the mobile device in response to detecting the arrival of the AV at the pick-up location, wherein the AR guidance is configured to provide the rider with navigation information to facilitate pick-up by the AV, and wherein initializing the AR guidance causes a capture of surrounding imagery with the mobile device.

10. The non-transitory computer-readable storage medium of claim 9, wherein the navigation information indicates a designated pick-up location.

11. The non-transitory computer-readable storage medium of claim 9, wherein the location information is based on a Light Detection and Ranging (LiDAR) map corresponding with the pick-up location.

12. The non-transitory computer-readable storage medium of claim 9, wherein the location information is based on a Global Positioning System (GPS) information associated with the mobile device.

* * * * *